(12) United States Patent
Qian et al.

(10) Patent No.: US 11,246,164 B2
(45) Date of Patent: Feb. 8, 2022

(54) METHOD AND APPARATUS FOR PERFORMING RANDOM ACCESS

(71) Applicant: Samsung Electronics Co., Ltd, Suwon-si (KR)

(72) Inventors: Chen Qian, Beijing (CN); Bin Yu, Beijing (CN); Qi Xiong, Beijing (CN); Yingjie Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/478,460

(22) PCT Filed: Jan. 16, 2018

(86) PCT No.: PCT/KR2018/000749
§ 371 (c)(1),
(2) Date: Jul. 16, 2019

(87) PCT Pub. No.: WO2018/131985
PCT Pub. Date: Jul. 19, 2018

(65) Prior Publication Data
US 2019/0364603 A1 Nov. 28, 2019

(30) Foreign Application Priority Data

Jan. 16, 2017 (CN) .......................... 201710030703.2
Feb. 6, 2017 (CN) .......................... 201710067252.X
(Continued)

(51) Int. Cl.
*H04L 27/26* (2006.01)
*H04W 74/08* (2009.01)
(Continued)

(52) U.S. Cl.
CPC ......... *H04W 74/0833* (2013.01); *H04J 13/12* (2013.01); *H04L 27/2605* (2013.01); *H04W 56/001* (2013.01)

(58) Field of Classification Search
CPC . H04W 56/001; H04W 74/002; H04W 72/04; H04W 74/0833; H04W 74/006;
(Continued)

(56) References Cited

U.S. PATENT DOCUMENTS

2006/0126570 A1* 6/2006 Kim .................... H04J 13/0048
370/335
2008/0170608 A1* 7/2008 Guey .................. H04J 13/0003
375/220
(Continued)

FOREIGN PATENT DOCUMENTS

| CN | 102958188 A | 3/2013 |
|---|---|---|
| CN | 103857057 A | 6/2014 |

(Continued)

OTHER PUBLICATIONS

"RAN1 Chairman's Notes", 3GPP TSG RAN WG1 Meeting #88bis, Apr. 3-7, 2017, 113 pages.
(Continued)

*Primary Examiner* — Edan Orgad
*Assistant Examiner* — Vanneilian Lalchinthang

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present application discloses a method for generating a random access preamble, comprising the following steps of: receiving random access configuration information, the random access configuration information comprising preamble resource pool information, the preamble resource pool infor-
(Continued)

mation comprising available base sequences; generating M sequences according to a base sequence, the M being greater than 1; and, generating a random access preamble according to the M sequences. The present application further discloses a device for generating a random access preamble, and a method and device for indicating random access configuration information. With the technical solutions disclosed by the present application, high frequency band multi-beam operations in 5G can be adapted, and the performance of the system in the random access process can be improved.

20 Claims, 10 Drawing Sheets

(30) Foreign Application Priority Data

May 31, 2017 (CN) .......................... 201710398587.X
Jan. 16, 2018 (KR) .......................... 10-2018-0005642

(51) Int. Cl.
*H04B 1/44* (2006.01)
*H04J 13/12* (2011.01)
*H04W 56/00* (2009.01)

(58) Field of Classification Search
CPC ...... H04J 13/004; H04J 13/0062; H04J 13/12; H04J 13/0025; H04J 13/0003; H04L 27/2659; H04L 27/2605; H04L 27/2607; H04L 27/2613; H04B 2201/70701
USPC .......................................................... 370/350
See application file for complete search history.

(56) References Cited

U.S. PATENT DOCUMENTS

| | | | | |
|---|---|---|---|---|
| 2014/0169303 A1* | 6/2014 | Jami | .................. | H04W 74/0866 |
| | | | | 370/329 |
| 2015/0282213 A1* | 10/2015 | Sun | .................. | H04W 74/0833 |
| | | | | 370/329 |
| 2015/0319779 A1* | 11/2015 | Li | .......................... | H04L 5/0007 |
| | | | | 370/329 |
| 2016/0192398 A1* | 6/2016 | Wang | .................... | H04L 5/0048 |
| | | | | 370/329 |
| 2016/0337103 A1* | 11/2016 | Kim | .................. | H04W 72/0446 |
| 2017/0013612 A1* | 1/2017 | Nayeb Nazar | ........ | H04L 5/0055 |
| 2017/0099174 A1* | 4/2017 | Kim | .................... | H04L 27/2607 |
| 2017/0346669 A1* | 11/2017 | Yu | ........................ | H04L 27/2647 |
| 2018/0083751 A1* | 3/2018 | Seo | ........................ | H04L 5/0037 |
| 2018/0109938 A1* | 4/2018 | Xiong | .................... | H04L 5/0048 |
| 2018/0145808 A1* | 5/2018 | Kim | .......................... | H04B 7/04 |
| 2018/0219644 A1* | 8/2018 | Ahn | ...................... | H04J 13/004 |
| 2020/0296765 A1* | 9/2020 | Kim | .................. | H04W 74/0833 |

FOREIGN PATENT DOCUMENTS

WO    2015/142086 A1    9/2015
WO    2016/112537 A1    7/2016

OTHER PUBLICATIONS

Samsung, "RACH preamble design", 3GPP TSG RAN WG1 NR #88, Feb. 13-17, 2017, 10 pages.
International Telecommunication Union, "IMT Traffic estimates beyond year 2020", Oct. 21, 2014, 35 pages.
International Telecommunication Union, "Future technology trends of terrestrial IMT systems", Nov. 2014, 32 pages.
International Telecommunication Union, "IMT Vision—Framework and overall objectives of the future development of IMT for 2020 and beyond", Sep. 2015, 21 pages.
International Search Report dated Apr. 30, 2018 in connection with International Patent Application No. PCT/KR2018/000749, 3 pages.
Written Opinion of the International Searching Authority dated Apr. 30, 2018 in connection with International Patent Application No. PCT/KR2018/000749, 8 pages.
First Office Action in connection with Chinese Application No. 201710398587.X dated Jul. 31, 2020, 11 pages.
Notice of Allowance dated Aug. 11, 2021 in connection with Chinese Patent Application No. 201710398587.X, 7 pages.

\* cited by examiner

[Fig. 1]
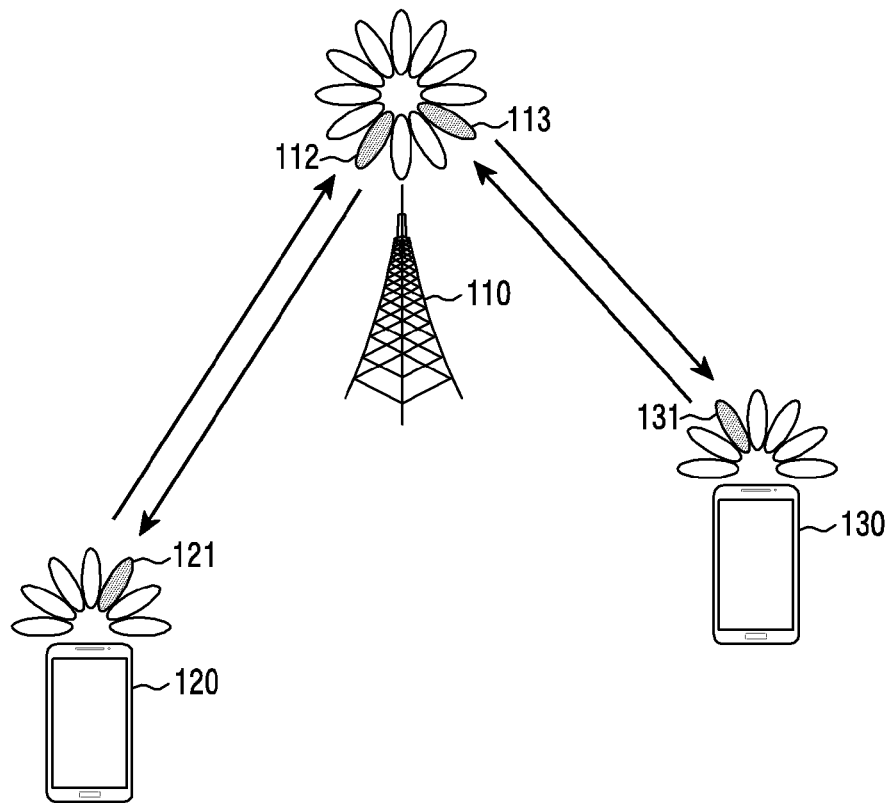
[Fig. 2]
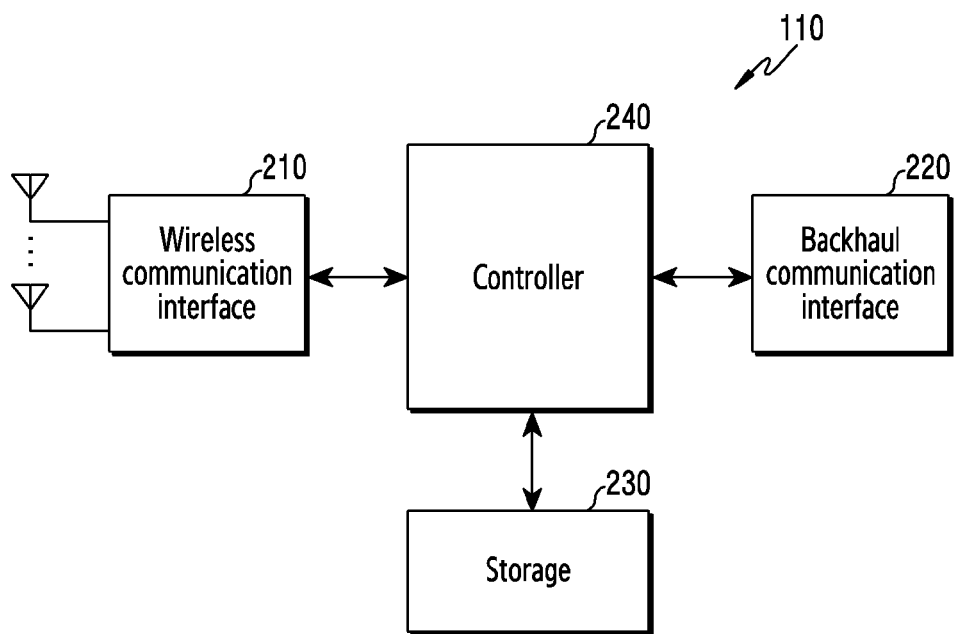

[Fig. 3]
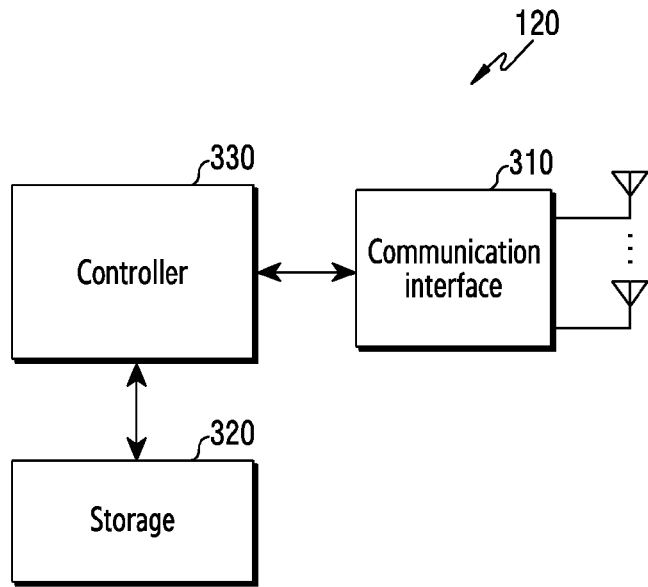
[Fig. 4]
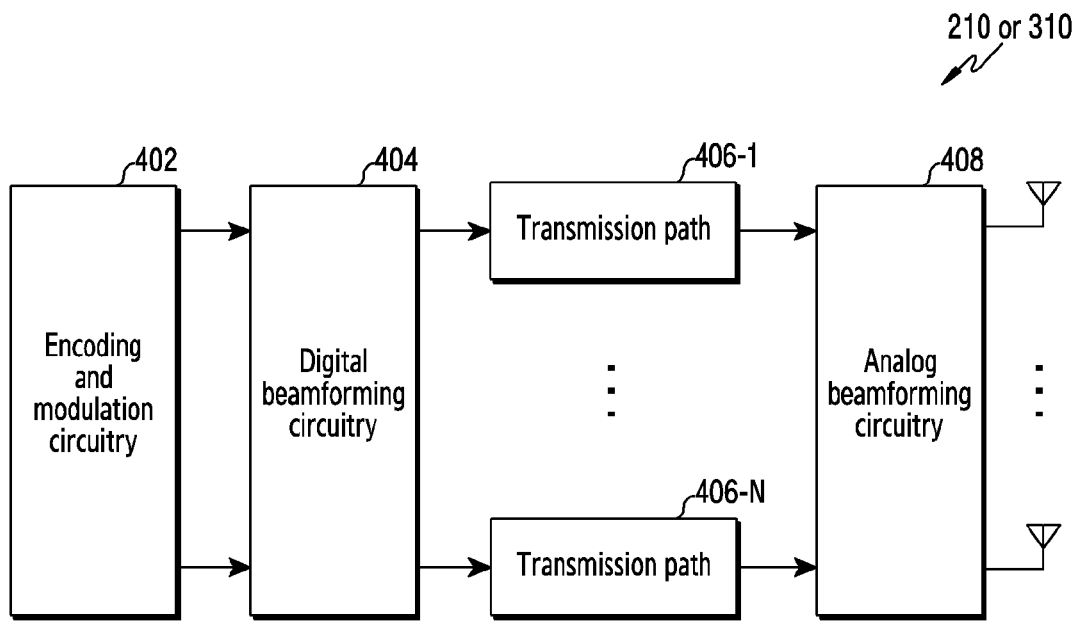

[Fig. 5]
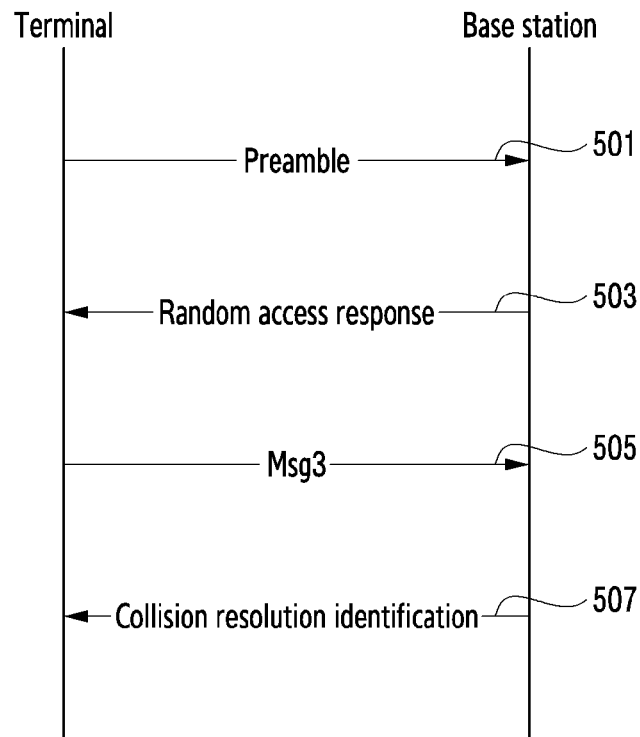
[Fig. 6]
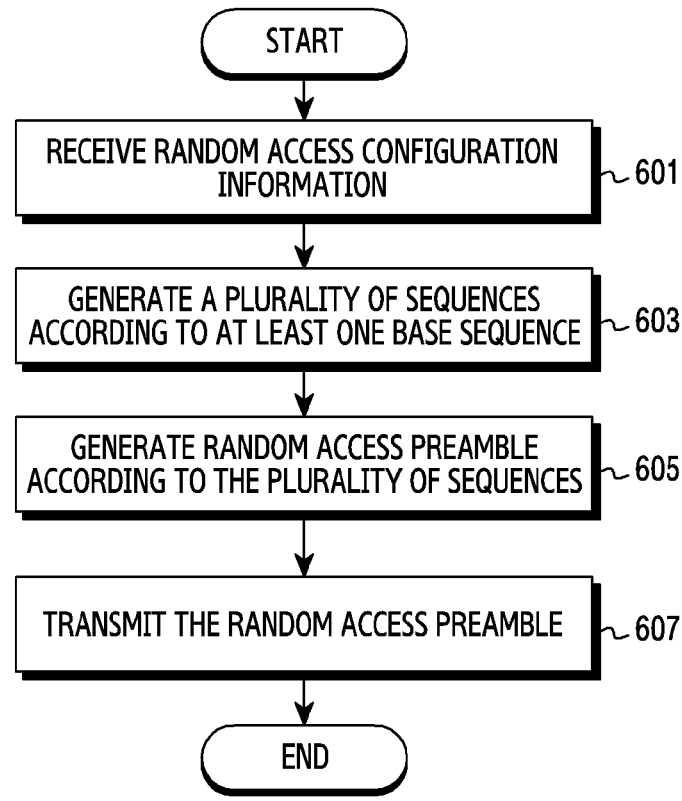

[Fig. 7]
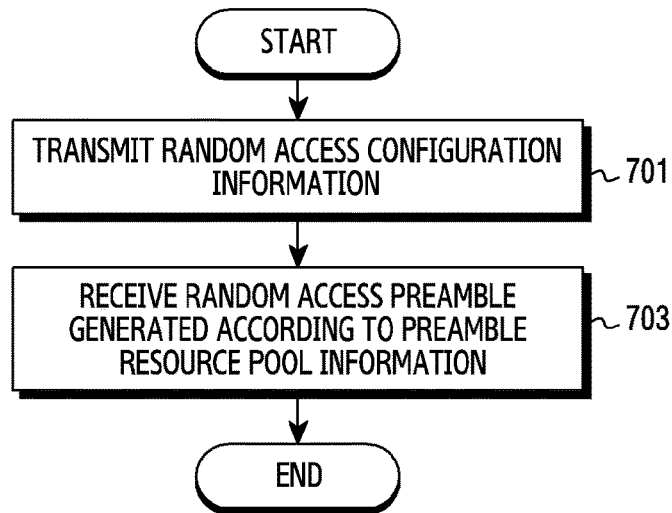
[Fig. 8]
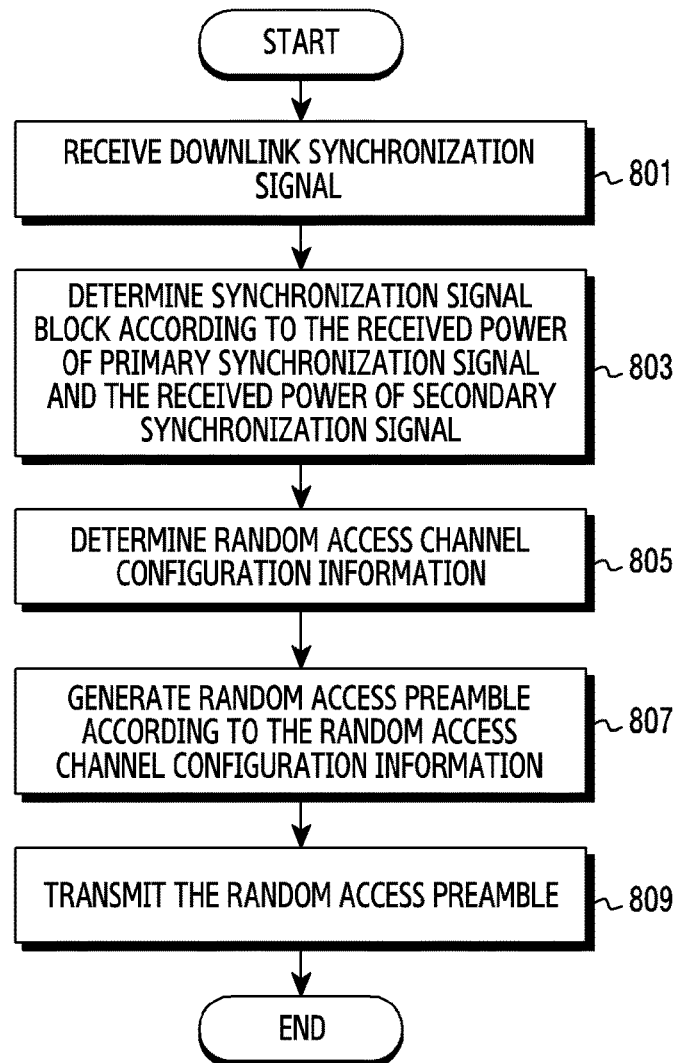

[Fig. 9]
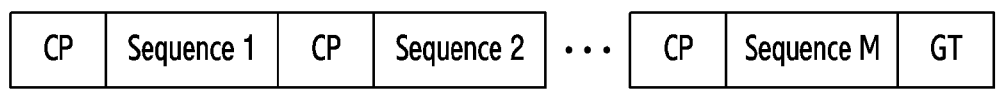
[Fig. 10]
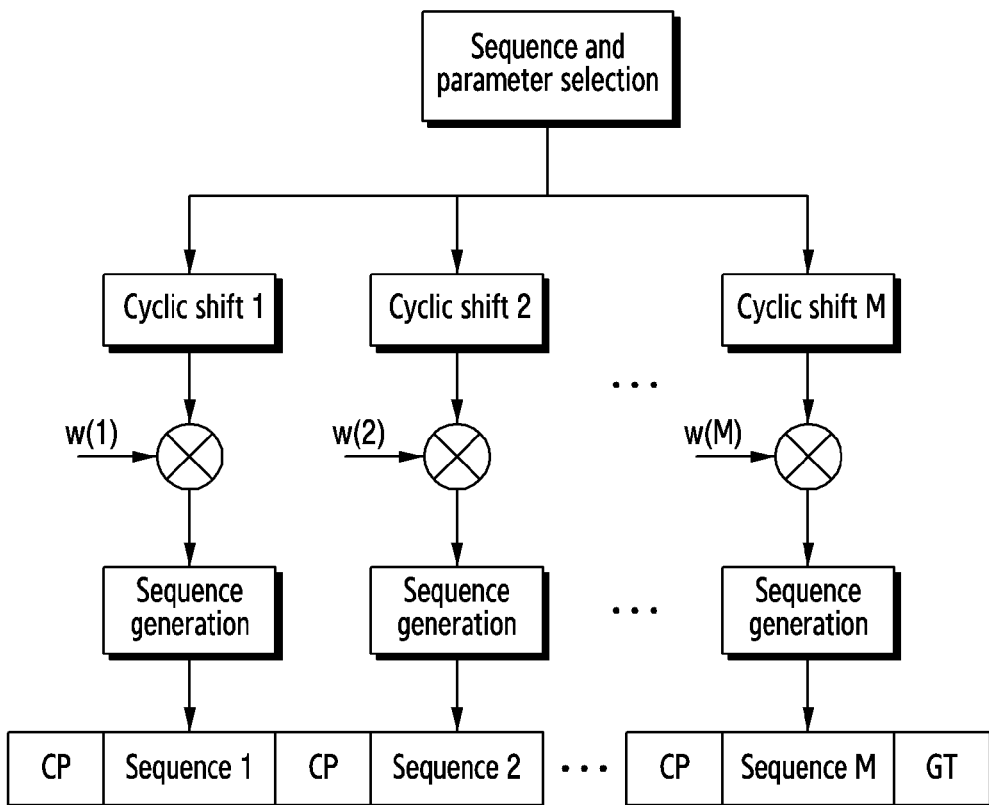

[Fig. 11]
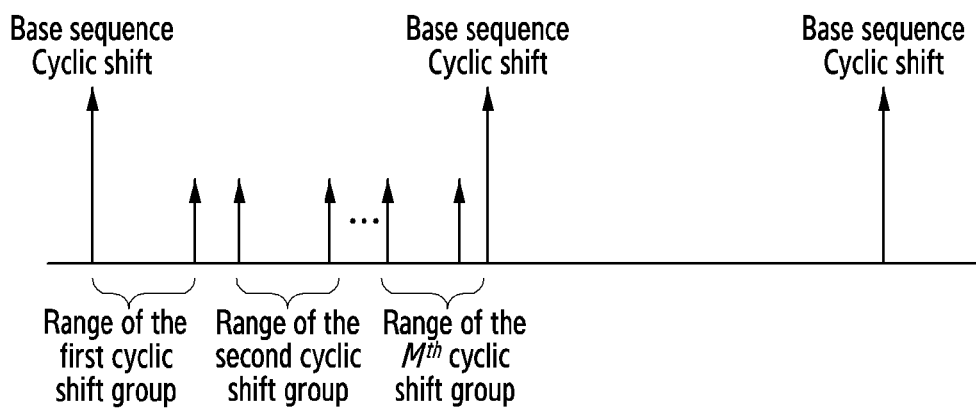
[Fig. 12]
| The base sequence identifier | The cyclic shift index | The orthogonal code index |
|---|---|---|
[Fig. 13]
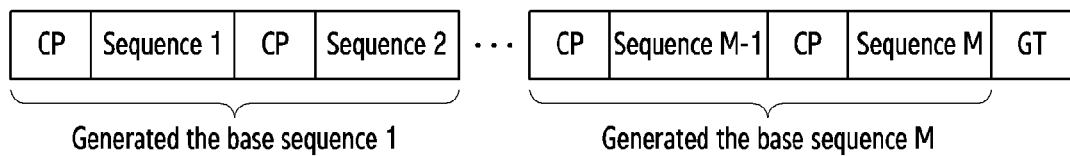

[Fig. 14]
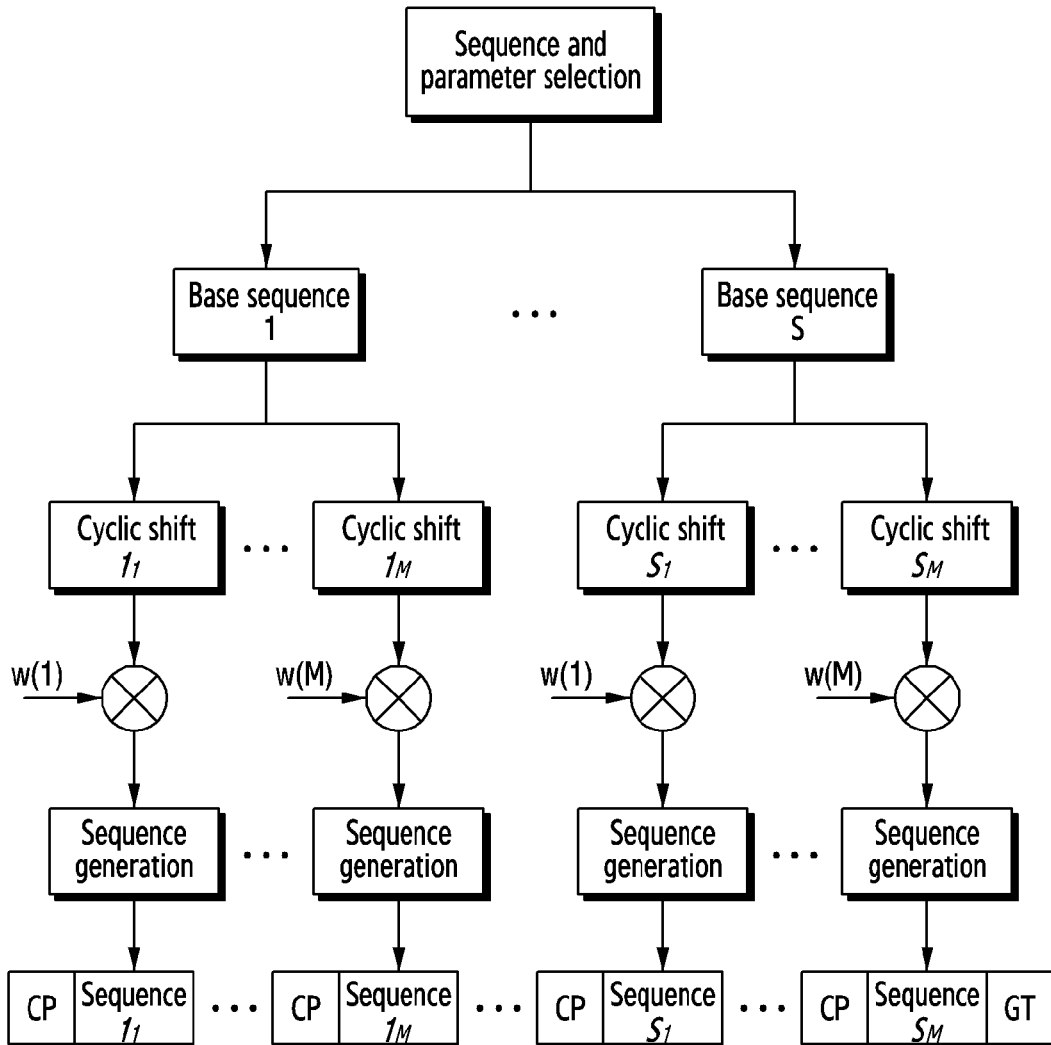
[Fig. 15]
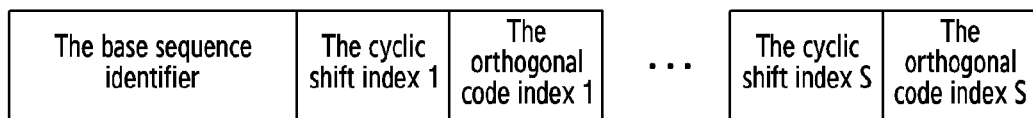

[Fig. 16]
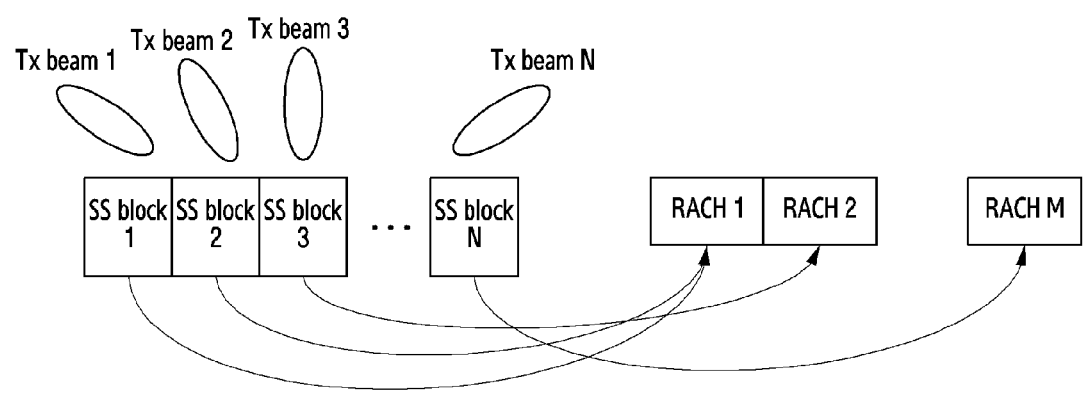

[Fig. 17]
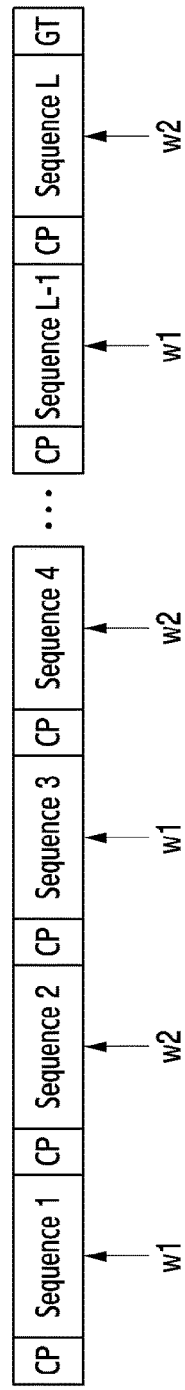
[Fig. 18]
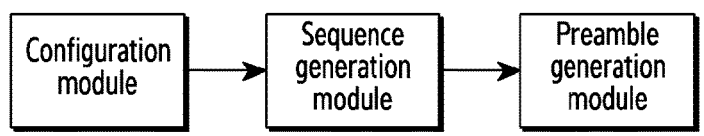

[Fig. 19]
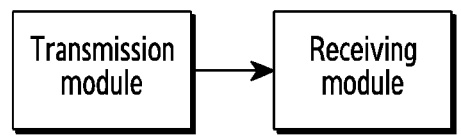

METHOD AND APPARATUS FOR PERFORMING RANDOM ACCESS

CROSS-REFERENCE TO RELATED APPLICATIONS

This application is a 371 of International Application No. PCT/KR2018/000749 filed on Jan. 16, 2018, which claims priority to Chinese Patent Application No. 201710030703.2 filed on Jan. 16, 2017, Chinese Patent Application No. 201710067252.X filed on Feb. 6, 2017, Chinese Patent Application No. 201710398587.X filed on May 31, 2017, and Korean Patent Application No. 10-2018-0005642 filed on Jan. 16, 2018, the disclosures of which are herein incorporated by reference in their entirety.

BACKGROUND

1. Field

The present application relates to the technical field of wireless communications, and in particular to a method and device for generating a random access preamble, and a method and device for indicating random access configuration information.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The rapid development of information industry, particularly the increasing demand from the mobile Internet and the Internet of Things (IoT), brings about unprecedented challenges in the future mobile communications technology. According to the ITU-R M. [IMT.BEYOND 2020. TRAFFIC] issued by the International Telecommunication Union (ITU), it can be expected that, by 2020, mobile services traffic will grow nearly 1,000 times as compared with that in 2010 (4G era), and the number of user equipment connections will also be over 17 billion, and with a vast number of IoT equipments gradually expand into the mobile communication network, the number of connected equipments will be even more astonishing. In response to this unprecedented challenge, the communications industry and academia have prepared for 2020s by launching an extensive study of the fifth generation of mobile communications technology (5G) .Currently, in ITU-R M. [IMT.VISION] from ITU, the framework and overall objectives of the future 5G have been discussed, where the demands outlook, application scenarios and various important performance indexes of 5G have been described in detail. In terms of new demands in 5G, the ITU-R M. [IMT.FUTURE TECHNOLOGY TRENDS] from ITU provides information related to the 5G technology trends, which is intended to address prominent issues such as significant improvement on system throughput, consistency of the user experience, scalability so as to support IoT, delay, energy efficiency, cost, network flexibility, support for new services and flexible spectrum utilization, etc.

The performance of random access directly influences the user's experience. For a conventional wireless communication system, for example, Long Term Evolution (LTE) or Long Term Evolution-Advanced (LTE-A), the random access process is applied in various scenarios such as establishment of an initial link, cell handover, reestablishment of an uplink, Radio Resource Control (RRC) and connection reestablishment, and is classified into contention-based random access and contention-free random access, depending upon whether a user equipment exclusively occupies preamble resources. Since, for the contention-based random access, each user equipment selects a preamble from same preamble resources when attempting to establish an uplink, there may be a case in which a multiple of user equipments select and transmit a same preamble to the base station. Therefore, the collision resolution mechanism becomes an important research direction in the random access. How to reduce the collision probability and how to quickly solve a collision that has occurred are key indicators influencing the random access performance.

The preamble format in the existing LTE has stipulated the sequence length of a preamble and the length of a corresponding cyclic prefix. For a high frequency band multi-beam operation in 5G, since both a terminal with beam reciprocity and a terminal without beam reciprocity need to be taken into consideration, the demands for the cell coverage are also taken into consideration. In addition, considering that the frequency deviation caused by the phase noise is serious in a high frequency band wireless communication environment, the preamble format in the existing LTE cannot satisfy the random access demands in 5G. Therefore, it is necessary to develop a new preamble format and a preamble generation way in order to satisfy the access demands in 5G.

SUMMARY

The present application provides a method and device for generating a random access preamble and a method and device for indicating random access configuration information in order to adapt to high frequency band multi-beam operations in 5G and to improve the system performance in the random access process.

The present application discloses a method for generating a random access preamble, comprising the steps of:

receiving random access configuration information, the random access configuration information comprising preamble resource pool information, the preamble resource pool information comprising available base sequences;

generating M sequences according to a base sequence among the available base sequences, the M being greater than 1; and generating a random access preamble according to the M sequences.

Preferably, the step of generating a random access preamble according to the M sequences comprises:

generating M corresponding time-domain sequences according to the M sequences, adding a Cyclic Prefix (CP) before each of the M time-domain sequences, successively connecting the M time-domain sequences added with the CP end to end, and adding a Guard Time (GT) at the end of the last sequence to obtain the random access preamble Preferably, the step of generating M corresponding time-domain sequences according to the M sequences comprises: generating M corresponding time-domain sequences according to the M sequences and waveform information indicated by a base station.

Preferably, the step of generating M sequences according to a base sequence among the available base sequences comprises: using one base sequence among the available base sequence as each of the M sequences.

Preferably, the preamble resource pool information further comprises: available cyclic shift groups; and the step of generating M sequences according to a base sequence among the available base sequences comprises: according to each cyclic shift parameter in one cyclic shift group among the available cyclic shift groups respectively, performing corresponding cyclic shift on one base sequence among the available base sequences to obtain the M sequences.

Preferably, the preamble resource pool information further comprises: available cyclic shift groups and available orthogonal codes; and the step of generating M sequences according to a base sequence among the available base sequences comprises: according to each cyclic shift parameter in one cyclic shift group among the available cyclic shift groups respectively, performing corresponding cyclic shifting on one base sequence among the available base sequences to obtain the M intermediate sequences; and, processing the M intermediate sequences by using one orthogonal code among the available orthogonal codes to obtain the M sequences.

Preferably, the preamble resource pool information further comprises: available orthogonal codes; and the step of generating M sequences according to a base sequence among the available base sequences comprises: processing one base sequence among the available base sequences by using one orthogonal code among the available orthogonal codes to obtain the M sequences.

Preferably, the step of generating M sequences according to a base sequence among the available base sequences comprises: using each of S base sequences among the available base sequences as the one base sequence respectively, and correspondingly processing by using a cyclic shift group among the available cyclic shift groups and/or an orthogonal code among the available orthogonal codes to obtain M_s sequences respectively, where M=M_s*S, M_s≥2 and S≥2.

Preferably, the step of generating M sequences according to a base sequence among the available base sequences comprises: correspondingly processing one base sequence among the available base sequences by using one cyclic shift group among the available cyclic shift groups and one orthogonal code among the available orthogonal codes to obtain M_s sequences, and repeating the M_s sequences for S times to obtain the M sequences, where M=M_s*S, M_s≥2 and S≥2.

Preferably, the step of generating M sequences according to a base sequence among the available base sequences comprises: correspondingly processing one base sequence among the available base sequences by using at least one cyclic shift group among the available cyclic shift groups and/or at least one orthogonal code among the available orthogonal codes to obtain M sequences.

Preferably, processing a sequence by using an orthogonal code comprises: multiplying a corresponding sequence by corresponding element of the orthogonal code, respectively.

Preferably, the base sequence used for generating the M sequences is selected from the available base sequences by a terminal or configured from the available base sequences to the terminal by a base station;

the cyclic shift group used for performing cyclic shifting on the base sequence is selected from the available cyclic shift groups by the terminal or configured from the available cyclic shift groups to the terminal by the base station; and the orthogonal code used for processing the sequence is selected from the available orthogonal codes by the terminal or configured from the available orthogonal codes to the terminal by the base station.

Preferably, cyclic shift parameters in the cyclic shift group are related to a Cell identification (ID).

Preferably, a way of generating the cyclic shift group is as follows:

$$C_m^i = [C_{ini}^i + mN_{cs}] \mod N_{cs}^{max}, 1 \le m \le M$$

where $C_m^i$ is a cyclic shift corresponding to the $m^{th}$ sequence of the $i^{th}$ cyclic shift group, the parameter $N_{cs}$ is a cyclic shift difference between two sequences, $N_{cs}^{max}$ is the allowable maximum cyclic shift, $C_{ini}^i$ is an initial cyclic shift of the $i^{th}$ cyclic shift group, and the $C_{ini}^i$ is related to the Cell ID.

Preferably, a way of generating an initial cyclic shift of the $0^{th}$ cyclic shift group is as follows:

$$C_{ini}^0 = f(n_{ID}^{cell})$$

where $n_{ID}^{cell}$ is the Cell ID, the function $f(\cdot)$ is a pseudo-random function of generating a random number between 0 and $N_{CS}^{group} M-1$, other cyclic shift groups except the $0^{th}$ cyclic shift group are linearly generated according to $C_{ini}^0$ and an inter-group cyclic shift interval $N_{CS}^{group}$, and $N_{CS}^{group} \ge N_{cs}^{max}$; and a way of generating the function $f(\cdot)$ is as follows:

$$f(n_{ID}^{cell}) = \left(\sum_{i=f_1}^{f_2} c(i) 2^{i-f_1}\right) \mod N_{CS}^{group} M$$

where $f_1$ and $f_2$ are a start point and a termination point of a summation term, the function $c(\cdot)$ is a pseudorandom generation function, and an initial value of the function $c(\cdot)$ is determined by the Cell ID.

Preferably, an identifier of the generated random access preamble comprises the following parts: a base sequence identifier and cyclic shift group index.

Preferably, an identifier of the generated random access preamble comprises the following parts: a base sequence identifier, a cyclic shift group and index an orthogonal code index.

Preferably, an identifier of the generated random access preamble comprises the following parts: a base sequence identifier and an orthogonal code index.

Preferably, an identifier of the generated random access preamble comprises the following parts: a base sequence identifier and a cyclic shift group index and/or an orthogonal code index.

The present application further discloses a device for generating a random access preamble, comprising a configuration module, a sequence generation module and a preamble generation module, wherein:

the configuration module is configured to receive random access configuration information, the random access configuration information comprising preamble resource pool information, the preamble resource pool information comprising available base sequences;

the sequence generation module is configured to generate M sequences according to a base sequence, the M being greater than 1; and the preamble generation module is configured to generate a random access preamble according to the M sequences.

The present application further discloses a method for indicating random access configuration information, comprising the steps of:

transmitting random access configuration information to a terminal, the random access configuration information comprising preamble resource pool information, the preamble resource pool information comprising available base sequences, cyclic shift groups and orthogonal codes; and receiving, from the terminal, a random access preamble generated according to the preamble resource pool information.

Preferably, parameters in the cyclic shift groups satisfy the following conditions: after performing cyclic shifting on each base sequence by using each cyclic shift group, other base sequence among available base sequences cannot be obtained, and cyclic shifts between different cyclic shift groups will not be interfered with each other.

The present application further discloses a device for indicating random access configuration information, comprising a transmission module and a receiving module, wherein:

the transmission module is configured to transmit random access configuration information to a terminal, the random access configuration information comprising preamble resource pool information, the preamble resource pool information comprising available base sequences, cyclic shift groups and orthogonal codes; and the receiving module is configured to receive, from the terminal, a random access preamble generated according to the preamble resource pool information.

The present application further discloses a method for generating a random access preamble, comprising the steps of:

performing downlink synchronization, determining an optimal synchronization signal block according to the received power of a primary synchronization signal and the received power of a secondary synchronization signal in a detected synchronization signal block, and reading an index of the synchronization signal block and random access channel configuration information in system information borne by a broadcast channel in the synchronization signal block; and generating a random access preamble according to the random access channel configuration information, and transmitting the random access preamble on the configured or selected random access channel resource, wherein the random access channel configuration information comprises preamble resource pool information and corresponding cover code codewords.

Preferably, the cover codes are orthogonal cover codes.

Preferably, the cover codes are sequence-based cover codes;

after determining the optimal synchronization signal block, the method further comprises: according to at least one of the system information borne in the primary synchronization signal, the system information borne in the secondary synchronization signal and the system information borne in the broadcast channel, as well as reference signal information inserted into a synchronization channel block, determining an index of the synchronization signal block and an index of a corresponding downlink Tx beam; and the step of generating a random access preamble according to the random access channel configuration information comprises: generating a cover code corresponding to the synchronization channel block according to the determined index and a predefined cover code generation way, and processing the generated preamble to obtain a final preamble.

Preferably, the step of generating a random access preamble according to the random access channel configuration information comprises: according to a beam reciprocity capability of a terminal, selecting a corresponding cover code to generate the random access preamble.

It can be know from the technical solutions that, by improving the format and generation way of the random access preamble, the present application can be adapted to high frequency band multi-beam operations in 5G, the preamble can be allocated more flexibly, and the frequency deviation caused by the phase noise can be better resisted. As a result, the system performance in the random access process can be improved.

In addition, in the method for generating a random access preamble disclosed in the present invention, an optimal synchronization signal block is determined from a multiple of synchronization signal blocks by downlink synchronization, and a random access preamble is generated by reading an index of the synchronization signal block and random access channel configuration information in system information borne by a broadcast channel in the synchronization signal block, so that the random access problem in a multi-beam system can be solved, and the system performance in the random access process can be improved.

Various embodiments of the present disclosure provide an improved system performance.

BRIEF DESCRIPTION OF THE DRAWINGS

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 is a signaling diagram of the conventional contention-based random access;

FIG. 6 is a flowchart of a terminal in a wireless communication system according to embodiments of the present disclosure;

FIG. 7 is a flowchart of a base station in a wireless communication system according to embodiments of the present disclosure;

FIG. 8 is another flowchart of a flowchart of a terminal in a wireless communication system according to embodiments of the present disclosure;

FIG. 9 is a schematic diagram of a random access preamble format according to Embodiment 1 of the present application;

FIG. 10 is a schematic diagram of a way of generating a preamble according to Embodiment 1 of the present application;

FIG. 11 is a schematic diagram of a relationship between cyclic shifts according to Embodiment 1 of the present application;

FIG. 12 is a schematic diagram of a preamble identifier according to Embodiment 1 of the present application;

FIG. 13 is a structural diagram of a preamble used in Embodiment 2 of the present application;

FIG. 14 is a schematic diagram of a way of generating a preamble according to Embodiment 2 of the present application;

FIG. 15 shows a structure of a preamble identifier according to a compromised implementation of the present application;

FIG. 16 is a schematic diagram of an indication relationship between a downlink broadcast channel and a random access channel resource according to Embodiment 2 of the present application;

FIG. 17 is a structural diagram of a preamble according to Embodiment 3 of the present application;

FIG. 18 is a schematic diagram of a composition structure of a preferred device for generating a random access preamble according to the present application; and FIG. 19 is a schematic diagram of a composition structure of a preferred device for indicating random access configuration information according to the present application.

DETAILED DESCRIPTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for performing random access in a wireless communication system.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, $3^{rd}$ Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 may transmit random access configuration information to a terminal and receive, from the terminal, a random access preamble generated according to the preamble resource pool information. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may receive random access configuration information, generate a plurality of sequences according to one base sequence among the plurality of base sequences, generate a random access preamble according to the plurality of sequences, and transmit, a base station, the random access preamble. According to exemplary embodiments of the present disclosure, the controller 330 may receive, from a base station, a downlink synchronization signal, determine a synchronization signal block according to received power of a primary synchronization signal and received power of a secondary synchronization signal in the downlink synchronization signal, determine random access channel configuration information in system information on a broadcast channel in the synchronization signal block, generate a random access preamble according to the random access channel configuration information, transmit the random access preamble on random access channel resource. For example, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

FIG. 5 is a signaling diagram of the conventional contention-based random access. FIG. 5 illustrates a signaling diagram between a terminal 120 and a base station 110.

Referring to FIG. 5, in a step 501, a terminal randomly selects a preamble e from a preamble pool and transmits the preamble to a base station. The base station performs correlation detection on the received signal, so as to identify the preamble transmitted by the terminal.

In a step 503, the base station transmits a Random Access Response (RAR) to the terminal, the RAR containing a random access preamble identifier, a timing advance instruction determined according to an estimation of a time delay between the terminal and the base station, a Temporary Cell-Radio Network Temporary Identifier (TC-RNTI), and time-frequency resources allocated for the terminal to perform uplink transmission next time.

In a step 505, the terminal transmits a Message 3 (MSg3) to the base station according to information in the RAR. The MSg3 contains information such as a terminal identifier and an RRC link request, wherein the terminal identifier is an identifier that is unique to a terminal and used for resolving collision.

In a step 507, the base station transmits a collision resolution identifier to the terminal, the collision resolution identifier containing a terminal identifier corresponding to a terminal who wins in the collision resolution. The terminal upgrades TC-RNTI to C-RNTI upon detecting its identifier, and transmits an ACK signal to the base station to complete the random access process and waits for the scheduling of the base station. Otherwise, the terminal will start a new random access process after a certain delay.

For a contention-free random access process, since the base station has already known the terminal identifier, it can allocate a preamble to the terminal. Thus, when transmitting a preamble, the terminal does not need to randomly select a sequence, and instead, it uses the allocated preamble. Upon detecting the allocated preamble, the base station will transmit a corresponding random access response, the random access response comprising information such as timing advance and uplink resource allocation. Upon receiving the random access response, the terminal considers that the uplink synchronization has been completed, and waits for the further scheduling of the base station. Therefore, the contention-free random access process contain only two steps: a first step of transmitting by a terminal a preamble to a base station, and a second step of transmitting by the base station a random access response to the terminal.

FIG. 6 is a flowchart of a terminal in a wireless communication system according to embodiments of the present disclosure. FIG. 6 illustrates exemplary operations of a terminal 120.

Referring to FIG. 6, in a step 601, the terminal, from a base station (e.g., base station 110), receives random access configuration information. The random access configuration information may comprise preamble resource pool information. The preamble resource pool information may comprise a plurality of base sequences.

In a step 603, the terminal generates a plurality of sequences according to one base sequence among the plurality of base sequences. In some embodiments, the terminal, according to each cyclic shift parameter in one cyclic shift group among a plurality of cyclic shift groups, may obtain a plurality of intermediate sequences by performing corresponding cyclic shift on one base sequence among the plurality of base sequences. The terminal may obtain the plurality of sequence by processing the plurality of intermediate sequences by using one orthogonal code among a plurality of orthogonal codes. The preamble resource pool information further may comprise the plurality of cyclic shift groups and the plurality of orthogonal codes. A random access preamble identifier may comprise at least one of a base sequence identifier, a cyclic shift group index, and an orthogonal code index.

In some embodiments, the terminal may use each of at least one base sequence among the plurality of base sequences. The terminal may generate at least one sequence group by processing at least one base sequence among the plurality of base sequences by using at least one cyclic shift group among the plurality of cyclic shift groups and at least one orthogonal code among the plurality of orthogonal codes. The terminal may obtain the plurality of sequence by repeating the at least one sequence group for at least one time. A random access preamble identifier may comprise at least one of a base sequence identifier, a cyclic shift group index, and an orthogonal code index. In some embodiments, the terminal may multiply the at least one base sequence by an element of the orthogonal code.

In some embodiments, the base sequence may be selected from the plurality of base sequences by the terminal or configured from the plurality of base sequences to the terminal by the base station. A cyclic shift group used for performing cyclic shift on the base sequence may be selected from the plurality of cyclic shift groups by the terminal or configured from the plurality of cyclic shift groups to the terminal by the base station. A orthogonal code used for processing the base sequence may be selected from the plurality of orthogonal codes by the terminal or configured from the plurality of orthogonal codes to the terminal by the base station.

In some embodiments, a cyclic shift parameter in the cyclic shift group may be related to a cell ID. The cyclic shift group is determined based on at least one of a cyclic shift difference between two sequences, an allowable maximum cyclic shift, an initial cyclic shift, and the cell ID.

In a step 605, the terminal generates a random access preamble according to the plurality of sequences. In some embodiments, the terminal may generate a plurality of time-domain sequences according to the plurality of sequences and waveform information indicated by the base station. The terminal may add a cyclic prefix (CP) before each of the plurality of time-domain sequences. The terminal may connect the plurality of time-domain sequences added with the CP end to end. The terminal may add a guard time (GT) at the end of the last sequence. In a step 607, the terminal transmits, a base station, the random access preamble.

FIG. 7 is a flowchart of a base station in a wireless communication system according to embodiments of the present disclosure. FIG. 7 illustrates exemplary operations of a base station 110.

Referring to FIG. 7, in a step 701, the base station transmits random access configuration information to a terminal (e.g., terminal 120). The random access configuration information may comprise preamble resource pool information. The preamble resource pool information may comprise at least one of a plurality of base sequences, cyclic shift groups, and orthogonal codes.

In a step 703, the base station receives, from the terminal, a random access preamble generated according to the preamble resource pool information. In some embodiments, a parameter in the cyclic shift groups may satisfy, after performing cyclic shift on each base sequence by using each cyclic shift group, a first condition that other base sequence among the plurality of base sequences cannot be obtained and a second condition that cyclic shifts between different cyclic shift groups will not be interfered with each other.

FIG. 8 is another flowchart of a flowchart of a terminal in a wireless communication system according to embodiments of the present disclosure. FIG. 8 illustrates exemplary operations of a terminal 120.

Referring to FIG. 8, in a step 801, a terminal receives, from a base station (e.g., base station 120), a downlink synchronization signal. In a step 803, a terminal determines a synchronization signal block according to received power of a primary synchronization signal and received power of a secondary synchronization signal in the downlink synchronization signal.

In a step 805, a terminal determines random access channel configuration information in system information on a broadcast channel in the synchronization signal block. In some embodiments, the random access channel configuration information may comprise preamble resource pool information and codewords of a cover code. The cover code may be a sequence-based cover code.

In some embodiments, a terminal, after determining the synchronization signal block, according to at least one of system information in the primary synchronization signal, system information in the secondary synchronization signal, the system information in the broadcast channel, and reference signal information inserted into a synchronization channel block, may determine an index of the synchronization signal block and an index of a corresponding downlink transmission (Tx) beam.

In a step 807, a terminal generates a random access preamble according to the random access channel configuration information. In some embodiments, a terminal, according to a beam reciprocity capability of the terminal, may select the cover code to generate the random access preamble. In a step 809, a terminal transmits the random access preamble on random access channel resource.

The present application provides a method for generating a random access preamble. The specific flow is as follows.

A terminal receives random access configuration information transmitted on a base station side. The configuration information comprises preamble resource pool information. Wherein, the preamble resource pool information at least comprises: available base sequences. Preferably, the preamble resource pool information can further comprise: available cyclic shift parameters and/or available orthogonal codes, or more. Wherein, preferably, the cyclic shift parameters are present in groups, and thus can also be referred to as cyclic shift groups.

According to the preamble resource pool information in the received random access configuration information, the terminal generates M sequences according to a base sequence among the available base sequences, where M is greater than 1; and, a Cyclic Prefix (CP) is added before each of the M sequences, the M sequences added with the CP are successively connected end to end, and a Guard Time (GT) is added at the end of the last sequence to obtain a random access preamble.

Wherein, a way of generating M sequences according to a base sequence among the available base sequences by the terminal comprises the following steps.

S1: According to a base sequence and a cyclic shift group which are selected randomly or configured by a base station, M intermediate sequences are generated based on the base sequence and according to the cyclic shift group.

S2: Based on the M intermediate sequences generated in step S1, M sequences are generated according to an orthogonal code which is selected randomly or configured by the base station.

After the M sequences are obtained, a random access preamble is obtained in accordance with the method described above, and a baseband signal is generated according to the structure of the random access preamble.

It is to be noted that, since the uplink transmission may adopt various different waveforms, for example, OFDM or SC-FDMA, the base station informs, by a broadcast channel, the terminal of waveform information used for transmitting the preamble; after generating M sequences in accordance with steps S1 and S2, the terminal generates M corresponding time-domain sequences according to waveform information indicated in the broadcast channel or predefined waveform information, and then adds a CP and a GT on the basis of the M time-domain sequences to eventually obtain the random access preamble.

Compared with the prior art, the method provided by the present invention can provide more available preambles, can relieve inter-cell interference and provide better coverage capability by cyclic shift randomization or in other ways, and can better support multi-beam operations in a high frequency band wireless communication environment.

The technical solutions of the present application will be further described below in details by several preferred embodiments.

Embodiment 1

In this embodiment, a way of generating a random access preamble will be described with reference to a specific system. It is assumed that the system operates in a high band. In order to compensate the serious path loss in a high frequency band wireless communication environment, both a base station and a terminal acquire a beamforming gain by beamforming or hybrid beamforming and by matching beam pairs on a receiver side and a transmitter side.

In the solution provided in this embodiment, FIG. 9 shows a random access preamble format.

As shown in FIG. 9, the random access preamble in this embodiment consists of a multiple of identical or different sequences (as shown in FIG. 2, sequence 1, sequence 2 sequence M). A Cyclic Prefix (CP) is added before each sequence, and a Guard Time (GT) is added at the end of all the sequences. In this embodiment, the way of generating the preamble will be described by taking the sequences being different from each other as example.

Different sequences in the preamble are generated from a same base sequence. The basis sequence is a Zadoff-Chu sequence (ZC sequence) with a cyclic shift orthogonal property. This base sequence is randomly selected, by the terminal and with an equal probability, from a preamble resource pool configured by the base station, or configured by the base station (for example, contention-free random access process). The different sequences in the preamble are generated from the base sequence by different cyclic shifts. For example, cyclic shifting is performed on the base sequence according to a cyclic shift group. A cyclic shift for the $m^{th}$ sequence is $C_m$, where m is a sequence number of a cyclic shift in the cyclic shift group, and $1 \leq m \leq M$. A way of generating the cyclic shift group or cyclic shift parameters is informed by the base station to the terminal through random access channel configuration information, or configured in a predefined way. As another configuration way, the base station informs, by broadcasting, a terminal in a cell of possible cyclic shift groups as a part of the random access preamble resource pool; and, when in a random access demand, the terminal randomly selects one cyclic shift group from the available cyclic shift groups in the random access preamble resource pool with an equal probability, and then generates each sequence forming the preamble in combination with the selected base sequence. In addition, for the contention-free random access process adopted by a terminal which operates in the connected state, both the base sequence and corresponding cyclic shift group configuration information are configured by the base station.

After a multiple of sequences are generated, the terminal selects an Orthogonal Cover Code (OCC), and multiplies each sequence by a corresponding element to obtain M sequences. For example, if the selected orthogonal cover code is $w=[w(1), \ldots, w(M)]$, the processed $m^{th}$ sequence is $d_m = w(m) d_m^{base}$, where the sequence $d_m^{base}$ is the $m^{th}$ sequence generated from the base sequence by cyclic shifting, the sequence $d_m$ is a sequence obtained after multiplying by the orthogonal cover code, and the element w(m) is the $m^{th}$ element of the orthogonal cover code. In accordance with the different number of sequences forming a preamble, the selected orthogonal cover code can be a Walsh code, a discrete fourier transform (DFT)-based orthogonal code or more. For example, a Walsh code having a length of 2 or 4 can be expressed as:

$$\begin{bmatrix} 1 & 1 \\ 1 & -1 \end{bmatrix}$$

and $$\begin{bmatrix} 1 & 1 & 1 & 1 \\ 1 & -1 & 1 & -1 \\ 1 & -1 & -1 & 1 \\ 1 & 1 & -1 & -1 \end{bmatrix}$$

where each row in the matrix denotes one orthogonal sequence. In other words, for a Walsh code having a length of 2, there are two selectable orthogonal codes; while for a Walsh code having a length of 4, there are at most four selectable orthogonal codes.

By taking orthogonal codes having a length of 3 as example, orthogonal codes are specifically designed based on DFT as follows:

$$\begin{bmatrix} 1 & 1 & 1 \\ 1 & e^{j2\pi/3} & e^{j4\pi/3} \\ 1 & e^{j4\pi/3} & e^{j2\pi/3} \end{bmatrix}$$

where each row in the matrix denotes one orthogonal sequence, and there are three available orthogonal sequences.

The selectable orthogonal code sequences are informed to the terminal by the random access configuration information or configured to the terminal in a predefined way, and the terminal selects from the selectable orthogonal code sequences with an equal probability. For a terminal which operates in the connected state, when it is required to initiate a contention-free random access process, the orthogonal code sequence is configured by the base station.

The way of generating the preamble can be briefly illustrated in FIG. 10.

In FIG. 10, the selection of sequences and parameters comprises: selection and generation of a base sequence, selection of cyclic shift parameters and orthogonal sequences, or more. The parameter w(m) is the $m^{th}$ element of the selected (configured) orthogonal sequence. The generation of sequences comprises: generation of time-domain sequences, addition of a CP, and addition of a GT at the end of the preamble.

It is assumed that the length of base sequences (i.e., each sequence in the preamble) is $N_{pre}$, and the base sequence selected from the resource pool by the terminal or configured by the base station is $x_u$, where the $n^{th}$ element is $x_u(n)$, $0 \le n \le N_{pre}-1$, and the subscript u denotes the $u^{th}$ root sequence of an available ZC sequence.

As a cyclic shift expression way, for the $m^{th}$ sequence, a sequence after cyclic shifting is: $x_{u,m}(n)=[x_u(n+C_m)] \bmod N_{pre}$. This way is suitable for a case where the preamble is generated in a time domain, for example, by using waveform configuration of SC-FDMA waveform, or defining and configuring cyclic shift parameters in the cyclic shift group in the time domain.

As another cyclic shift expression way, for the $m^{th}$ sequence, a sequence after cyclic shifting is: $x_{u,m}(n)=e^{j\alpha_m n}x_u(n)$, where a relationship between $\alpha_m$ and the above $C_m$ is $\alpha_m=2\pi C_m/N_{pre}$. This way is suitable for a case where the preamble is generated in a frequency domain, for example, by using waveform configuration of OFDM waveform, or defining and configuring cyclic shift parameters in the cyclic shift group in the frequency domain.

Considering the one-to-one association of the definitions of the cyclic shift parameters in the frequency domain or in the time domain, the base station merely transmits the parameters having definitions related to the cyclic shift group in the time domain or the frequency domain, and the terminal determines a way of implementing cyclic shifting according to the used waveform.

The orthogonal sequence is w, and the $m^{th}$ element of the orthogonal sequence is w(m), where $0 \le m \le M-1$, and M is the length of the orthogonal sequence, i.e., the number of sequences in the preamble. The $m^{th}$ sequence processed by time-domain spreading (i.e., an orthogonal cover code) is expressed as: $y_{u,m}(n)=w(m)x_{u,m}(n)$. The $m^{th}$ sequence is obtained from a sequence $y_{u,m}$ by baseband signal generation (i.e., time-domain signal generation).

It is to be noted that, as a particular case of the above situation, a multiple of sequences forming a preamble can use a same cyclic shift. In this case, different base sequences can be characterized by different cyclic shifts, so there is no cyclic shifting step in the implementation shown in FIG. 10 correspondingly.

Similarly, as a particular case of the example of FIG. 10, a multiple of sequences forming a preamble can use different cyclic shifts, and do not use orthogonal code spreading. Correspondingly, there is no step of multiplying by a spreading factor w(i) after the cyclic shifting step in the implementation shown in FIG. 10.

In order to reduce the inter-cell interference, the generation of a cyclic shift can be related to a Cell ID. For example, a way of generating a cyclic shift group related to the Cell ID can be expressed as:

$$C_m^i=[C_{ini}^i+mN_{cs}] \bmod N_{cs}^{max}, 1 \le m \le M$$

where $C_m^i$ is a cyclic shift corresponding to the $m^{th}$ sequence of the $i^{th}$ cyclic shift group. The parameter $N_{cs}$ is a cyclic shift difference between two sequences, $N_{cs}^{max}$ is the allowable maximum cyclic shift, $C_{ini}^i$ is an initial cyclic shift of the $i^{th}$ cyclic shift group, and the $C_{ini}^i$ is related to the Cell ID. As a possible way, a way of generating an initial cyclic shift of the $0^{th}$ cyclic shift group is as follows:

$$C_{ini}^0=f(n_{ID}^{cell})$$

where $n_{ID}^{cell}$ is the Cell ID, and the function $f(\cdot)$ is a pseudorandom function of generating a random number between 0 and $N_{CS}^{group}M-1$. Other cyclic shift groups can be linearly generated according to $C_{ini}^0$ and an inter-group cyclic shift interval $N_{CS}^{group}$; and generally, $N_{CS}^{group} \ge N_{cs}^{max}$. A simple way of generating the function $f(\cdot)$ is as follows:

$$f(n_{ID}^{cell}) = \left(\sum_{i=f_1}^{f_2} c(i)2^{i-f_1}\right) \bmod N_{CS}^{group}M$$

Where $f_1$ and $f_2$ are a start point and a termination point of a summation term; the function $c(\cdot)$ is a pseudorandom generation function, for example, using a generation way based on M-sequences or Gold sequences; and an initial value of the function $c(\cdot)$ is determined by the Cell ID.

In order to satisfy the conditions that cyclic shifts of different cyclic shift groups are not collided with each other and a cyclic-shifted base sequence will not become another base sequence, the relationship between the cyclic shifts of base sequences and each cyclic shift in the cyclic shift groups should be the relationship shown in FIG. 11.

The example relationship shown in FIG. 11 indicates that, after selecting a base sequence, this base sequence will not become another base sequence after experiencing cyclic shift, and cyclic shifts in different groups will not be interfered with each other.

In this embodiment, the preamble resource pool information comprises base sequence information, available cyclic shift group information and available orthogonal sequence information. The preamble resource pool information is informed, by a master information block or a system information block indicated by the master information block, and in a broadcast channel, to the terminal through random access configuration information. For a terminal which needs to adopt the contention-based random access process, a base sequence, a cyclic shift group and an orthogonal sequence are randomly selected from the preamble resource pool with an equal probability, and a preamble is generated in the above way. However, for a terminal which needs to adopt the contention-free random access process, the information used for generating a preamble is directly configured by the base station. In other words, the base station informs the configured base sequence, cyclic shift group information and orthogonal sequence information.

The terminal generates a preamble in the above way, and transmits the preamble on the random access channel resource configured by the base station. For a terminal that has no beam reciprocity and needs to try a multiple of Tx beam directions, the structure can perform transmission in random access channel resources by using a same Tx beam. The base station configures a multiple of random access channel resources, and the terminal transmits a random access preamble on different random access channel resources by using different Tx beams. In another case, different sequences use different Tx beams to perform transmission.

If detecting the transmission of a preamble, the base station will transmit a random access response within a corresponding random access response detection window. The random access response comprises an identifier of the preamble, timing advance information, a Temporary Cell-Radio Network Temporary Identifier (TC-RNTI) allocated by the base station, or more. Wherein, in this embodiment, the identifier of the preamble can comprise the following parts: a base sequence identifier, a cyclic shift group index and an orthogonal code index, as shown in FIG. 12.

Wherein, the length of the base sequence identifier is determined by the number of base sequences, the length of the cyclic shift group index is determined by the number of available cyclic shift groups, and the length of the orthogonal code index is determined by the length of available orthogonal codes. The base station determines the content of the preamble identifier according to the detected preamble, and then transmits the content in the random access response.

The terminal determines, according to the used preamble generation way, whether the preamble identifier detected in the random access response corresponds to the transmitted preamble.

Embodiment 2

In this embodiment, a method for generating a random access preamble will be described in the combination with a specific system. The scheme in Embodiment 1 is that a multiple of sequences forming a preamble are generated from a same base sequence. However, in this embodiment, a multiple of sequences forming a preamble are generated from different base sequences. In this embodiment, it is still assumed that the system operates in a high band, and acquires, by a multi-beam operation and hybrid beamforming or simulated beamforming, a beamforming gain which is sufficient to compensate for the path loss.

The preamble structure used in this embodiment is shown in FIG. 13.

In the structure shown in FIG. 13, a preamble consists of a multiple of sequences, a CP is added before each sequence, and a GT is added at the end of the preamble. Wherein, every M_s sequences are generated from a same base sequence, and are thus called a sequence group. Specifically, in FIG. 13, a preamble consists of M sequences, where M is an even number. Every two adjacent sequences are generated from a same base sequence. In other words, in the example shown in FIG. 13, M_2 is 2. In practical applications, the value of M_s can be a value greater than 2. Here, M_s≥2, and S≥2.

The way of generating sequences from a same base sequence is similar to that in Embodiment 1. In other words, each sequence is generated according to the selected or configured base sequence and a cyclic shift in a cyclic shift group, and each sequence forming the preamble is generated according to the selected or configured orthogonal code. The way of generating a preamble in this embodiment is shown in FIG. 14.

In the way shown in FIG. 14, S base sequences, cyclic shift groups and orthogonal sequences are selected from a preamble resource pool according to the configuration of the preamble resource pool, then sequences forming a preamble are generated separately, and the preamble consisting of a multiple of sequence is eventually generated.

In the generation way, the preamble identifier consists of S parts, and the structure of each part, as shown in FIG. 12, consists of a base sequence identifier, a cyclic shift group index and an orthogonal sequence index.

In another simple generation way, the terminal selects, according to configuration information of a preamble resource pool, one base sequence, one cyclic shift group and one orthogonal sequence with an equal probability to generate M_s sequences. The M_s sequences are repeated for S times and a GT is added at the end of the sequences so as to be used as a preamble for the random access process.

A difference between this method and the way shown in FIG. 14 lies in that the different sequences groups in the way shown in FIG. 14 are generated from different base sequences, different cyclic shifts and different orthogonal codes. However, in the above simple generation way, the different sequence groups are generated from a same base sequence, a same cyclic shift and a same orthogonal code. Compared with the generation way of FIG. 14, this simple generation way has the advantage that the length of the preamble identifier can be shortened greatly.

In another compromised implementation, the terminal selects, from the available resource pool, one base sequence, one or more cyclic shift groups and one or more orthogonal sequences. The generation way is similar to that in FIG. 14. In this way, the structure of the identifier of the preamble is shown in FIG. 15, comprising a base sequence identifier, an cyclic shift index 1, an orthogonal code index 1 . . . a cyclic shift index S, and an orthogonal code index S.

The base station determines the preamble identifier according to the detected preamble, and then transmits the preamble identifier in a random access response. According to the preamble randomly selected from the preamble resource pool with an equal probability when transmitting the preamble or the preamble configured by the base station, the terminal determines whether the determined preamble identifier is matched with that in the detected random access response.

Embodiment 3

In combination with the random access preamble structure provided by the present invention, this embodiment provides a mapping relationship between downlink broadcast channels and random access resources. In this embodiment, the system adopts a multi-beam operation, i.e., realizing a large coverage by a multiple of narrow beams. Meanwhile, the base station uses a multiple of synchronization signal blocks, and each synchronization signal block comprises a primary synchronization signal, a secondary signal and a broadcast channel. Each synchronization signal block corresponds to a different or same base station side Tx beam. The broadcast channel in Tx beam block informs, by the system information borne on the broadcast channel, the time-frequency resource information of a random access channel corresponding to the corresponding synchronization signal block (or broadcast channel), and the corresponding random access preamble resource pool information.

In this embodiment, the broadcast channels in a multiple of synchronization signal blocks indicate a same random access channel time-frequency resource, and different synchronization signal blocks use different or same downlink Tx beams. FIG. 16 is a schematic diagram of an indication relationship between a downlink broadcast channel and a random access channel resource in this embodiment.

In FIG. 16, the base station uses N downlink synchronization signal blocks (expressed by SS block1 to SS blockN) during downlink synchronization. Each synchronization signal block uses one downlink Tx beam to perform transmission. In the example of FIG. 16, different synchronization signal blocks use different downlink Tx beams. In practical applications, different synchronization signal blocks can also use a same downlink Tx beam. One or more random access channel time-frequency resources are allocated in an uplink channel, and the random access channel time-frequency resource indicated by a multiple of synchronization signal block is the same. In the example of FIG. 16, the random access channel time-frequency resource indicated by two synchronization signal blocks is the same. For example, both SS block1 and SS block2 indicate RACH1. The time-frequency resource for a random access channel is configured by the random access channel configuration in the system information. In addition, it is to be noted that different random access channel time-frequency resources can correspond to different numbers of synchronization signal blocks.

The random access channel configuration in the system information will configure random access preamble resource pool information. Random access preamble resource pools for different random access channel time-frequency resources can configure the same random access preamble. Since it is required to distinguish different synchronization signal blocks (so as to implicitly indicate different downlink Tx beams), when different synchronization signal blocks for indicating a same random access channel time-frequency resource indicate random access preamble resource pools, it is necessary to indicate random access preamble resource pools which are not overlapped with each other, in order to determine a time-frequency resource for transmitting the preamble and synchronization signal block information of the base station and determine a downlink Tx beam for transmitting the random access response.

In a simple indication way, when indicating a preamble resource pool, a starting index of preamble indexes and the number of preambles in the preamble resource pool are indicated by preamble indexes, or a preamble starting index and a preamble ending index are indicated, in order to indicate a range of preamble indexes in the preamble resource pool.

If the preamble generation way provided by the present invention is adopted, the complete random access preamble consists of a multiple of different preambles, and the multiple of different preambles can be obtained from one or more base sequences by cyclic shift and orthogonal cover code processing. A simple way of allocating a preamble resource pool is as follows.

The preamble resource pool contains two parts: preambles (or a combination of base sequences and cyclic shift groups) and orthogonal cover codes. The preamble resource pool indicated by one random access channel configuration contains a codeword of only one orthogonal cover code. The preamble format described above can be shown in FIG. 17.

In FIG. 17, the length of the used orthogonal cover code is 2 and expressed as w=[w1 w2], where both w1 and w2 are real numbers. The random access preamble consists of a multiple of sequences, and each element of two adjacent sequences is multiplied by w1 and w2, respectively. In a broader sense, the length of the orthogonal cover code is $n_{occ}$, and the multiplication can be performed before IDFT (or IFFT) or after IDFT (or IFFT). Each of the generated sequence is added with a CP, and then cascaded to form the random access preamble.

A multiple of sequences forming a same random access preamble can be different sequences in the preamble resource pool, or be generated from one sequence in the preamble resource pool by a multiple of cyclic shifts. In the former case, the random access preamble resource pool consists of a multiple of preambles and one orthogonal cover code codeword, and the terminal selects a multiple of preambles to form a random access preamble; however, in the latter case, the random access preamble resource pool consists of one or more base sequences, a multiple of cyclic shift groups and one orthogonal cover code codeword, and the terminal selects a base sequence and a cyclic shift group to form a random access preamble.

$n_{occ}$ successive sequences processed by a same orthogonal cover code can be a multiple of sequences randomly selected from the random access preamble resource pool, or a multiple of sequences formed by performing cyclic shifting on one base sequence in the random access preamble resource pool, or a multiple of sequences formed by repeating one sequence in the random access preamble resource pool, or more.

The orthogonal cover code can be an orthogonal sequence, for example, a Walsh code, a DFT codeword or more. When the orthogonal codeword is used, an index of a corresponding codeword is predefined by a lookup table, and the index of the corresponding orthogonal codeword is informed when configuring the random access channel configuration information. Table 1 shows index examples of a Walsh codebook having a length of 2, Table 2 shows index examples of a DFI codebook having a length of 3, and Table 3 shows index examples of a Walsh codebook having a length of 4.

TABLE 1

Indexes of the Walsh codebook having a length of 2

| Index | Codeword |
|---|---|
| 0 | [+1 +1] |
| 1 | [+1 −1] |

TABLE 2

Indexes of the DFT codebook having a length of 3

| Index | Codeword |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

TABLE 3

Indexes of the Walsh codebook having a length of 4

| Index | Codeword |
|---|---|
| 0 | [+1 +1 +1 +1] |
| 1 | [+1 +1 −1 −1] |
| 2 | [+1 −1 −1 +1] |
| 3 | [+1 −1 +1 −1] |

Codewords in the codebooks are merely exemplary, and other orthogonal codebooks can also be used as orthogonal cover codes. In addition to the examples, the cover code can be a quasi-orthogonal codeword. In a simple example, an M-sequence, a Gold sequence or other polynomial-based pseudorandom sequence is used, a generator polynomial is predefined for generating the pseudorandom sequence, and the initial state of the M-sequence is related to the index of the used synchronization signal block. For example, the generated sequence is $w(i)=c(i+N_c)$, where $N_c$ is a starting position of truncation of the pseudorandom sequence and configured by a higher-layer signaling. The function $c(n)$ is a function of generating the pseudorandom sequence, which can be an M-sequence or a Gold sequence. The initial state of the M-sequence is $c_{init}=f(N_{ss})$. If the pseudorandom sequence is a Gold sequence, in a possible way, the initial state of one M-sequence is fixed, while the initial state of another M-sequence is $c_{init}=f(N_{ss})$. Wherein, $N_{ss}$ is the index of the selected synchronization signal block, and $f(N_{ss})$ is a function related to $N_{ss}$. The cover code generated in this way is expressed as: $w=[w(1), \ldots, w(N_{occ})]$. The multiple of preambles selected by the terminal are a multiple of preambles generated from one or more base sequences selected by the terminal by cyclic shifting, where each element of the $i^{th}$ sequence is multiplied by $w(i)$, and then the preambles are added with a CP after switched to the time domain and cascaded to form the random access preamble. Or, the multiple of preambles selected by the terminal are a multiple of preambles generated from one or more base sequences selected by the terminal by cyclic shifting, wherein, after the preambles are switched to the time domain, each element of the $i^{th}$ sequence is multiplied by $w(i)$, then added with a CP and cascaded to form the random access preamble.

If the orthogonal cover code is used in the solutions provided in this embodiment, actions on the terminal side can be briefly described below.

Step 1: Downlink synchronization is performed to acquire random access channel configuration information. Specifically, an optimal synchronization signal block is determined according to the received power of a primary synchronization signal and the received power of a secondary synchronization signal in the received and detected synchronization signal blocks, and an index of the synchronization signal block and random access channel configuration information in system information borne by a broadcast channel in the synchronization signal block are read.

Step 2: A random access preamble is generated according to the random access channel configuration information, and is then transmitted on the configured or selected random access channel resource. Wherein, the random access channel configuration information comprises preamble resource pool information and corresponding cover code codewords.

If the terminal uses a sequence-based cover code, the actions of the terminal are as follows:

Step 1: Downlink synchronization is performed. An optimal synchronization signal block is determined according to the power of a primary synchronization signal and a secondary synchronization signal in the received and detected synchronization signal blocks. The optimal synchronization signal block refers to a synchronization signal block having the maximum detected power.

Step 2: According to at least one of the system information borne in the primary synchronization signal, the system information borne in the secondary synchronization signal and the system information borne in a broadcast channel, as well as reference signal information inserted into a synchronization channel block, an index of the synchronization signal block or an index of a corresponding downlink Tx beam is determined.

Step 3: A cover code corresponding to the synchronization channel block is generated according to the determined index and a predefined cover code generation way, the generated preamble is processed to generate a final preamble, and the final preamble is transmitted on the configured or selected random access channel resource.

If the solutions provided in this embodiment are used, actions on the base station side can be briefly described below.

Step 1: A base station configures and transmits a downlink synchronization signal.

Step 2: The base station receives and detects a random access preamble.

Step 3: The base station determines, according to the random access channel time-frequency resource information and preamble information, a downlink Tx beam for transmitting a random access response.

If the terminal uses a sequence-based cover code, the actions of the base station can be described below.

Step 1: A base station configures and transmits a downlink synchronization signal.

Step 2: The base station receives and detects a random access preamble.

Step 3: The base station determines, according to the random access channel time-frequency resource information and preamble information (information about the cover code on the preamble), a downlink Tx beam for transmitting a random access response.

Meanwhile, the way for distinguishing preambles can be used for distinguishing a terminal with beam reciprocity from a terminal without beam reciprocity. Specifically, the terminal with beam reciprocity and the terminal without beam reciprocity multiplexing the same random access channel time-frequency resources. As described above, the preamble resource pool comprises two parts: preambles (or a combination of base sequences and cyclic shift groups) and cover codes. Since, in the preamble resource pools used by the terminal with beam reciprocity and the terminal without beam reciprocity, the preambles (or a combination of base sequences and cyclic shift groups) are partially the same, but the two preamble resource pools use different cover codes, for example, different orthogonal cover codewords and code covers generated from different sequences.

Upon reading the system information, the terminal selects one preamble from all available preambles (or a combination of base sequences and cyclic shift groups) with an equal probability or uses a preamble (or a combination of a base sequence or a cyclic shift group) allocated by the base station, then selects a corresponding cover code according to the beam reciprocity capability of the terminal to generate a final random access preamble and transmits the final random access preamble on a corresponding random access channel time-frequency resource.

Embodiment 4

In this embodiment, a procedure for a communication between the terminal and the base station employing the way of generating a preamble provided in the present invention will be introduced.

In this embodiment, synchronization signal blocks consist of a primary synchronization signal, a secondary synchronization signal and broadcasting channel. In order to be adapted for a multi-beam operation in high frequency band, different symbols from the same synchronization signal blocks are transmitted by the same downlink transmitted beam of the base station, while different synchronization signal blocks are transmitted using the same or different downlink transmitted beam of the base station. The master information block is transmitted in the broadcasting channel among the synchronization signal blocks, wherein the master information block contains some information essential for accessing the network including system frame number, the location of synchronization signal block in the radio frame such as the time index of the synchronization block and so on, the scheduling information of the Remaining Minimum System Information (RMSI) such as the time-frequency resource configuration for the control information of the RMSI, and so on, and system bandwidth information, etc.

The random access configuration information is included in the RMSI, wherein the random access channel configuration information, preamble resource pool information and so on are included in the random access allocation information. Regarding the multi-beam operation system, the base station needs to determine the downlink transmitted beam for transmitting the random access response by the base station according to the association between synchronization signal block or corresponding downlink signal and the time-frequency resource for random access channel as well as the preamble groups. When the plurality of synchronization signal blocks are mapped to the same time-frequency resource for random access channel, the grouping of the preamble will be needed for the identification to the UE about the downlink signal or synchronization signal block, in order to determine the downlink transmitted beam.

If the content for RMSI transmission is the same with respect to the different direction for downlink transmitted beam, the RMSI needs to inform the terminal about all the random access configuration information associated with all of the synchronization signal blocks.

A way of indicating the preamble resource pool for random access will be mainly introduced in this embodiment. In this embodiment, the random access configuration information includes the random access channel configuration information associated with the synchronization signal block and the preamble resource pool information for random access associated with the synchronization signal block. Since the cover code is employed to distinguish the preamble sequence resource for random access associated with different downlink signal, and the following way of indicating could be employed: (a) the preamble resource pool is grouped into sequence resource pool and cover code resource. The random access configurations associated with different downlink signal employ the same sequence resource pool, the random access configurations associated with different transmitted beam employ different cover code. (b) The preamble resource pool is grouped into sequence resource pool and cover code resource. The random access configurations associated with different downlink signal employ different sequence resource pool, the random access configurations associated with different transmitted beam employ different cover code. (c) As the combination of the above two ways, for example, the random access configurations associated with different downlink signal employ the same or different sequence resource pool, and the same sequence resource pool is employed but the random access configurations associated with different downlink transmitted beam employ different cover code.

With respect to the way of indicating the cover code resource, the possible indicating ways are as follows:

1. Only available orthogonal cover code sets are indicated. And the cover code used for synchronization signal blocks is determined according to the predefined association or the association indicated in the RMSI. One possible way is that the corresponding cover code is determined according to the index of the synchronization signal block. One simple example is that the orthogonal cover code with length M is employed, the index of the cover code associated with the synchronization signal block having index of $n_{SS}$:

$$m_{SS} = \mathrm{mod}(n_{SS}, M)$$

Wherein mod( ) is modular operation.

As another simple example, orthogonal cover code having length M is employed, the index of the cover code associated with the synchronization signal block having an index of $n_{SS}$ is:

$$m_{SS} = \mathrm{mod}\left(\left\lfloor \frac{n_{SS}}{M} \right\rfloor, M\right)$$

The first way is corresponding to the situation that the different orthogonal cover codes are employed in the synchronization signal blocks with adjacent indexes, that is, under the assumption that a plurality of the adjacent synchronization signal block may be mapped to the same time-frequency resource for random access. For example, when M=2 and the number of synchronization signal block is 16, the indexes of the orthogonal cover codes associated with the different synchronization signal block:

[0 1 0 1 0 1 0 1 0 1 0 1 0 1 0 1]

The second way is corresponding to the situation that the same orthogonal cover code may be employed in the synchronization signal blocks with adjacent indexes. For example, when M=2 and the number of synchronization signal block is 16, the indexes of the orthogonal cover code associated with the different synchronization signal blocks are:

[0 0 1 1 0 0 1 1 0 0 1 1 0 0 1 1]

In above way, only available cover code and corresponding index are required to be indicated. If corresponding rule and predefined way are determined, additional information is not required to be indicated. In addition, the corresponding rule may also be indicated via RMSI.

2. A set of available cover codes is indicated, and the index of the orthogonal cover code associated with each synchronization is indicated in the RMSI. The indexes of the cover codes associated with the each of the synchronization signal blocks are arranged as per the indexes of the synchronization signal blocks, in the RMSI, and the sequence constituting of the indexes is indicated in the RMSI. As an example where M=2 and the number of the synchronization signal blocks is 16, the sequence consisting of the indexes informed in the RMSI is:

[0 0 1 0 1 0 1 1 0 1 0 1 0 0 0 1]

In the above example, a part of the different synchronization signal blocks associate with the same time-frequency resource for random access channel, different orthogonal cover codes are required for distinguishing the different preamble, for example, synchronization signal block 1, 2. The other part of the synchronization signal blocks associate with the corresponding time-frequency resource for random access channel in a one-to-one manner.

When the available orthogonal cover codes are quite many, the overhead required for such a way is high, but more flexible association may be supported.

3. Both of the above-mentioned two ways are suitable for the situation where RMSI transmitted via different beams are the same. Regarding the situation where the RMSI transmitted via the different beam are different, the RMSI transmitted by different base station downlink beam may carry the index for the cover code associated with, besides the way of still using way 1.

4. Regarding the random access configuration associated with the different downlink beams, when the sequence resource pool are different, the possible configuration way is that the number of sequence among the sequence resource pool in the random access configuration associated with each of synchronization signal blocks as well as the corresponding index of the cover code are listed in the RMSI according to the order of the index for synchronization signal blocks. Moreover, when the information carried by the RMSI which is transmitted via the different base station downlink transmitted beam, RMSI transmitted by each of the downlink transmitted beam only needs to carry the number of the sequences among the sequence resource pool associated with the beam and the indexes of the cover code.

Besides the several ways mentioned above, in some situations, the different synchronization signal blocks associate with the different time-frequency resource for random access. At this time, the base station may be indicated of corresponding downlink transmitted beam information via the time-frequency resource for random access channel, without a plurality of cover code for distinguishing downlink transmitted beam. For this case, one possible way is that the indication information for cover code activation is added among random access configuration information. For example, the variable OCC_flag is added into the random access configuration information. If the indication information is 1, then it is indicated that the way of generating preamble using cover code is activated, and the preamble resource is indicated in the above-mentioned way; if the indication information is 0, it is indicated that the way of generating preamble using cover code is not activated. In this way, the way of generating preamble based on cover code is not employed, or it should be considered as the cover code is a sequence full of 1. Another possible way is that the configuration way provided in this embodiment is still employed, regarding the situation where synchronization signal blocks may associate with the time-frequency resource for random access channel in one to one manner, the number of the available cover code is configured to be 1, and the cover code is a sequence full of 1. The indication information for the cover code activation is 0, which indicates that when the way of generating preamble using cover code is not employed, the indication relevant to the cover code such as the indication of the index for the cover code and soon, may still exist, but the terminal may ignore the relevant indication, that is, the indication relevant to the cover code is invalid. And the preamble is still generated in a way of generating preamble without cover code.

Another configuration way about whether to select preamble in the form of cover code is that a variety of preamble formats are set, wherein some preamble sequence formats do not employ the above-mentioned way of generating preamble using cover code, or the length of cover code is considered to be 1 as default, or the cover code is considered to be a sequence full of 1. The other preamble format employs the above-mentioned way of generating preamble using cover code.

The way of determining used preamble pool resource for random access by the terminal is as follows:

The terminal detects the downlink synchronization signal. The terminal detects synchronization signal blocks in which one or more measurement results are higher than predefined threshold through blind detection, wherein the measurement results include the reference signal receiving power of primary synchronization signal, and etc.

The terminal selects the synchronization signal block according to the predetermined criterion, and read the master system information in the broadcasting channel. The criterion usually is that the synchronization signal block having highest measurement result is selected or one synchronization signal block is selected among the synchronization signal block having measurement result higher than the predetermined threshold with equal probability. The terminal reads the master system information in the synchronization signal blocks, and acquires indexes of synchronization signal blocks.

The terminal reads the random access configuration information in the RMSI according to the master system information. The random access configuration information includes time-frequency information for random access channel, preamble format information, preamble resource pool information, etc. The terminal reads sequence pool information and the index information of the cover code associated with the synchronization signal block, and acquires preamble resource pool information. If the above-mentioned the indication of the cover code activation is employed, the terminal is required to reads the indication of the cover code activation. If the indication of the cover code activation is 1, that is, the indication of the cover code is activated, then the sequence resource pool information and the indication relevant to the cover code are read, and the way of generating preamble using the cover code is employed. If the indication of the cover code activation is 0, that is, the indication relevant to the cover code is not activated, then only sequence resource pool information is read, but the indication relevant to the cover code is not read.

The terminal generates preamble according to the indication in the random access configuration information, and transmits the preamble on the time-frequency resource for the random access channel.

The way of detecting and receiving the random access preamble by the base station is similar with the embodiment 3, is sketched as follows:

The base station detects the information on the time-frequency resource for the random access channel, if the transmission of the preamble is detected, then determines downlink transmitted beam according to the time-frequency resource and the index information of the cover code;

The base station determines the index of the optimum synchronization signal block detected by the terminal according to time-frequency resource and the association between the index of the cover code and the downlink signal, and determines the optimum downlink transmitted beam based thereon, for transmitting random access response.

In addition, it should be noted that the method provided in this embodiment is suitable for the situation where the base station has beam reciprocity capability or not. For the case without beam reciprocity capability, the adaptation may be performed by configuring the preamble format over and over again, and the configuration way provided in this embodiment is not affected.

Corresponding to the method described above, the present application further provides a device for generating a random access preamble. FIG. 18 shows a composition structure of the device, comprising a configuration module, a sequence generation module and a preamble generation module, wherein:

the configuration module is configured to receive random access configuration information, the random access configuration information comprising preamble resource pool information, the preamble resource pool information comprising available base sequences;

the sequence generation module is configured to generate M sequences according to a base sequence, the M being greater than 1; and the preamble generation module is configured to generate a random access preamble according to the M sequences.

Corresponding to the method for generating a random access preamble, the present application further provides a method for indicating random access configuration information, which is applied on a base station side. The method comprises the steps of:

transmitting random access configuration information to a terminal, the random access configuration information comprising preamble resource pool information, the preamble resource pool information comprising available base sequences, cyclic shift groups and orthogonal codes; and receiving, from the terminal, a random access preamble generated according to the preamble resource pool information.

Corresponding to the method described above, the present application further provides a device for indicating random access configuration information. FIG. 19 shows a composition structure of the device, comprising a transmission module and a receiving module, wherein:

the transmission module is configured to transmit random access configuration information to a terminal, the random access configuration information comprising preamble resource pool information, the preamble resource pool information comprising available base sequences, cyclic shift groups and orthogonal codes; and the receiving module is configured to receive, from the terminal, a random access preamble generated according to the preamble resource pool information.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method performed by a terminal in a wireless communication system, the method comprising:
   receiving, from a base station, configuration information for a random access channel (RACH) including information on a plurality of base sequences; and
   transmitting, to the base station, a RACH preamble based on the configuration information,
   wherein the RACH preamble is generated based on a plurality of sequences, a plurality of cyclic prefixes (CPs), and a guard time (GT),
   wherein the plurality of sequences are different,
   wherein the plurality of sequences are generated based on at least one of the plurality of base sequences,
   wherein each of the plurality of sequences is concatenated with a corresponding CP of the plurality of CPs, and
   wherein the GT is concatenated with a last sequence of the plurality of sequences.

2. The method of claim 1, further comprising:
   obtaining a plurality of intermediate sequences by performing corresponding cyclic shift on the at least one of the plurality of base sequences based on each cyclic shift group among a plurality of cyclic shift groups; and
   obtaining the plurality of sequences by processing the plurality of intermediate sequences by using an orthogonal code among a plurality of orthogonal codes,
   wherein the configuration information further includes the plurality of cyclic shift groups and the plurality of orthogonal codes.

3. The method of claim 2, further comprising:
generating at least one sequence group by processing the at least one of the plurality of base sequences by using at least one cyclic shift group among the plurality of cyclic shift groups and at least one orthogonal code among the plurality of orthogonal codes; and
obtaining the plurality of sequences by repeating the at least one sequence group for at least one time.

4. The method of claim 2, further comprising:
multiplying the at least one of the plurality of base sequences by an element of the orthogonal code.

5. The method of claim 2,
wherein a cyclic shift parameter in the cyclic shift group is related to a cell identification (ID), and
wherein the cyclic shift group is determined based on at least one of a cyclic shift difference between two sequences, an allowable maximum cyclic shift, an initial cyclic shift, or the cell ID.

6. A base station in a wireless communication system, the base station comprising:
at least one transceiver; and
at least one processor, operatively coupled to the at least one transceiver, configured to:
transmit, to a terminal, configuration information for a random access channel (RACH) including information on a plurality of base sequences, and
receive, from the terminal, a RACH preamble based on the configuration information,
wherein the RACH preamble is generated based on a plurality of sequences, a plurality of cyclic prefixes (CPs), and a guard time (GT),
wherein the plurality of sequences are different,
wherein the plurality of sequences are generated based on at least one of the plurality of base sequences,
wherein each of the plurality of sequences is concatenated with a corresponding CP of the plurality of CPs, and
wherein the GT is concatenated with a last sequence of the plurality of sequences.

7. The base station of claim 6,
wherein the configuration information further includes a plurality of cyclic shift groups and a plurality of orthogonal codes,
wherein the plurality of sequences are obtained based on processing a plurality of intermediate sequences by using an orthogonal code among the plurality of orthogonal codes,
wherein the plurality of intermediate sequences are obtained by performing corresponding cyclic shift on the at least one of the plurality of base sequences based on a cyclic shift group among the plurality of cyclic shift groups.

8. The base station of claim 7,
wherein the at least one processor is further configured to transmit, to the terminal, a random access response for the RACH preamble, and
wherein the random access response comprises a base sequence identifier for the at least one of the plurality of base sequences, a cyclic shift group index of the cyclic shift group, and an orthogonal code index of the orthogonal code among the plurality of orthogonal codes.

9. The base station of claim 7,
wherein a cyclic shift parameter in the cyclic shift group is related to a cell identification (ID), and
wherein the cyclic shift group is determined based on at least one of a cyclic shift difference between two sequences, an allowable maximum cyclic shift, an initial cyclic shift, or the cell ID.

10. A terminal a wireless communication system, the terminal comprising:
at least one transceiver; and
at least one processor, operatively coupled to the at least one transceiver, configured to:
receive, from a base station, configuration information for a random access channel (RACH) including information on a plurality of base sequences, and
transmit, to the base station, a RACH preamble based on the configuration information,
wherein the RACH preamble is generated based on a plurality of sequences, a plurality of cyclic prefixes (CPs) and a guard time (GT),
wherein the plurality of sequences are different,
wherein the plurality of sequences are generated based on at least one of the plurality of base sequences,
wherein each of the plurality of sequences is concatenated with a corresponding CP of the plurality of CPs, and
wherein the GT is concatenated with a last sequence of the plurality of sequences.

11. The terminal of claim 10, wherein the at least one processor is further configured to:
obtain a plurality of intermediate sequences by performing corresponding cyclic shift on the at least one of the plurality of base sequences based on each cyclic shift group among a plurality of cyclic shift groups; and
obtain the plurality of sequences by processing the plurality of intermediate sequences by using an orthogonal code among a plurality of orthogonal codes,
wherein the configuration information further includes the plurality of cyclic shift groups and the plurality of orthogonal codes.

12. The terminal of claim 11, wherein the at least one processor is further configured to:
generate at least one sequence group by processing the at least one of the plurality of base sequences by using at least one cyclic shift group among the plurality of cyclic shift groups and at least one orthogonal code among the plurality of orthogonal codes; and
obtain the plurality of sequences by repeating the at least one sequence group for at least one time.

13. The terminal of claim 11, wherein the at least one processor is further configured to multiply the at least one of the plurality of base sequences by an element of the orthogonal code.

14. The terminal of claim 11,
wherein a cyclic shift parameter in the cyclic shift group is related to a cell identification (ID), and
wherein the cyclic shift group is determined based on at least one of a cyclic shift difference between two sequences, an allowable maximum cyclic shift, an initial cyclic shift, or the cell ID.

15. The method of claim 1, further comprising:
receiving, from the base station, a plurality of synchronization signal blocks (SSBs) associated with a plurality of downlink beams,
wherein the RACH preamble is transmitted on a time-frequency resource for indicating a downlink beam among the plurality of downlink beams, and
wherein SSBs corresponding to the time-frequency resource are associated with different orthogonal codes.

16. The method of claim 1,
wherein the RACH preamble includes a first sequence and a second sequence, wherein the first sequence generated based on one of the plurality of base sequences is concatenated with a first CP, and wherein the second sequence generated based on one of the plurality of base sequences is concatenated with a second CP.

17. The base station of claim 6, transmitting, to the terminal, a plurality of synchronization signal blocks (SSBs) associated with a plurality of downlink beams, wherein the RACH preamble is received on a time-frequency resource for indicating a downlink beam among the plurality of downlink beams, and wherein SSBs corresponding to the time-frequency resource are associated with different orthogonal codes.

18. The base station of claim 6, wherein the RACH preamble includes a first sequence and a second sequence, wherein the first sequence generated based on one of the plurality of base sequences is concatenated with a first CP, and wherein the second sequence generated based on one of the plurality of base sequences is concatenated with a second CP.

19. The terminal of claim 10, wherein the at least one processor is further configured to:

receive, from the base station, a plurality of synchronization signal blocks (SSBs) associated with a plurality of downlink beams, wherein the RACH preamble is transmitted on a time-frequency resource for indicating a downlink beam among the plurality of downlink beams, and wherein SSBs corresponding to the time-frequency resource are associated with different orthogonal codes.

20. The terminal of claim 10, wherein the RACH preamble includes a first sequence and a second sequence, wherein the first sequence generated based on one of the plurality of base sequences is concatenated with a first CP, and wherein the second sequence generated based on one of the plurality of base sequences is concatenated with a second CP.

\* \* \* \* \*